United States Patent [19]
Wagner et al.

[11] 3,783,759
[45] Jan. 8, 1974

[54] ELECTRONIC EXPOSURE CONTROL ARRANGEMENT IN PHOTOGRAPHIC APPARATUS

[75] Inventors: Karl Wagner, Ottobrunn; Klaus Nicolay, Gruenwald, both of Germany

[73] Assignee: Agfa-Gevaert Aktiengesellschaft, Leverkusen, Germany

[22] Filed: Mar. 19, 1973

[21] Appl. No.: 342,807

Related U.S. Application Data

[63] Continuation of Ser. No. 63,096, Aug. 12, 1970.

[30] Foreign Application Priority Data

Aug. 20, 1969 Germany.................. P 19 42 287.8

[52] U.S. Cl............................. 95/10 CT, 95/53 EB
[51] Int. Cl........................... G03b 7/08, G03b 9/62
[58] Field of Search ..................... 95/10 CE, 10 CT, 95/10 CD, 53 EB

[56] References Cited
UNITED STATES PATENTS

| | | | |
|---|---|---|---|
| 3,636,842 | 1/1972 | Nobusawa | 95/10 CT |
| 3,721,167 | 3/1973 | Ogiso | 95/10 CT |
| 3,726,200 | 4/1973 | Ogiso et al. | 95/10 CT |

*Primary Examiner*—Samuel S. Matthews
*Assistant Examiner*—Russell E. Adams, Jr.
*Attorney*—Michael S. Striker

[57] ABSTRACT

One input of a differential amplifier is connected to a charging or discharging capacitor and the other input to a discharging capacitor that has previously been charged to the voltage across one leg of a voltage divider consisting of a photoconductor and a resistor connected in series across a battery. When the voltages at the two inputs are approximately equal, one branch of the differential amplifier shuts off, de-energizing the shutter control magnet and closing the camera shutter.

3 Claims, 3 Drawing Figures

INVENTOR
Dr. KARL WAGNER
KLAUS NICOLAY

BY

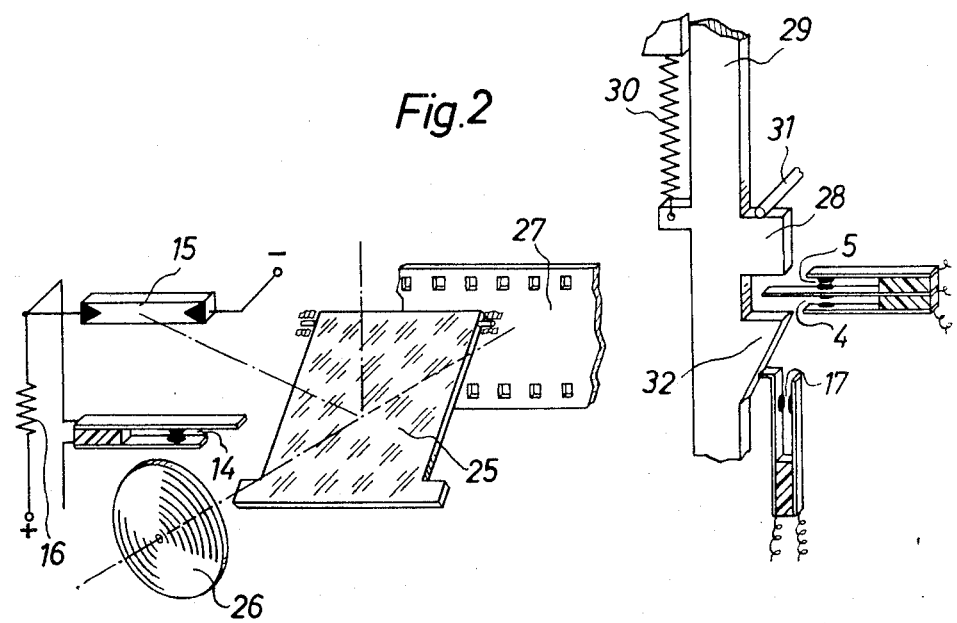

ELECTRONIC EXPOSURE CONTROL ARRANGEMENT IN PHOTOGRAPHIC APPARATUS

CROSS-REFERENCE TO RELATED APPLICATIONS

The present application is a continuation application of copending parent application Ser. No. 63,096 filed by the inventors of the present application on Aug. 12, 1970.

BACKGROUND OF THE INVENTION

The invention relates to photographic apparatus, such as a single lens reflex camera, having an electronic exposure control arrangement that comprises a capacitor, photosensitive means, and a shutter-control magnet.

In photographic apparatus of this kind, it is common to use the capacitor and the photosensitive means as a timing means for operating a trigger stage. A shutter-control magnet is controlled by the trigger stage to close the camera shutter.

SUMMARY OF THE INVENTION

An object of the invention is to provide an exposure control arrangement that uses for the trigger stage a different time control in which the photosensitive means, such as a photoconductor, is decoupled from the capacitor.

The exposure control arrangement of the invention essentially comprises electric circuit means having voltage source means, voltage divider means connected across the voltage source means and comprising photosensitive means, such as photoconductor, exposed to scene light and having a voltage thereacross varying in dependence on the strength of the incident scene light and first resistance means series-connected with the photosensitive means to form a common junction, whereby the voltage at the common junction varies in dependence on the strength of the scene light incident on the photosensitive means, amplifier means having first and second inputs, first switch means for connecting the second input to the common junction, whereby the voltage at the common junction determines a voltage at the second input, first capacitor means connected to the first input, second switch means for connecting the first capacitor means in the electric circuit means so that the former can assume a first charged state before exposure and a second charged state during exposure so as to vary the voltage at the first input in dependence on the charged state of the first capacitor means, and connected in the electric circuit means electrically operated means for closing the shutter in dependence on approximately equal voltages at the first and second inputs.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 schematically shows a mechanical embodiment for use with the embodiments shown in FIGS. 1 and 1b.

DESCRIPTION OF THE PREFERRED EMBODIMENTS

Figure 1A:
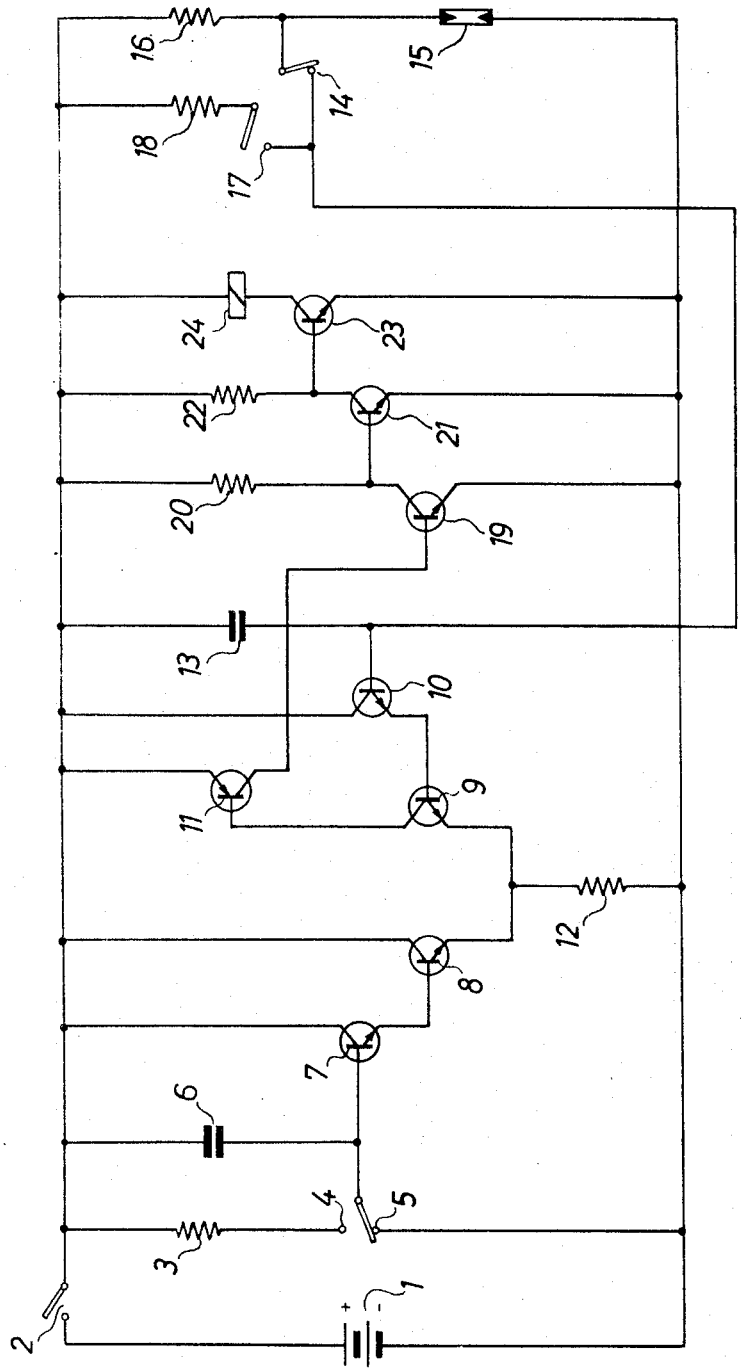
FIG. 1a is a circuit diagram of one embodiment of the invention.

With reference to FIG. 1a, a voltage source 1 is connected by an operating switch 2 to an electronic exposure control arrangement. A contact 4 of a first switch 4, 5 shunts a second resistor 3 across a first capacitor 6. The capacitor 6 can be charged through the contact 5 to the voltage of the source 1. The capacitor 6 is connected to the base of a transistor 7 of a differential amplifier, which also comprises the transistors 8, 9, 10, and 11. The common-emitter circuit of transistors 8 and 9 has a resistor 12.

The transistor 7 is one input of the differential amplifier. The other input of the differential amplifier is comprised by the transistor 10 the base of which is connected to a second capacitor 13. The base of the input transistor 10 is connected by a switch 14 to a common junction of a voltage divider consisting of a photoconductor 15 and a fixed first resistor 16. A third resistor 18 can be connected in parallel across the capacitor 13 by a switch 17. Switches 14 and 17 constitute additional switch means in this embodiment.

Transistor 11 of the differential amplifier is connected by its collector to the base of a transistor 19 of a trigger stage, the collector of transistor 19 being connected to a resistor 20. The collector of transistor 19 is also connected to the base of a transistor 21, of which the collector is connected to a resistor 22. This collector is also connected to the base of a transistor 23 the collector of which is connected to the shutter-control magnet 24.

As shown in FIG. 2, the switch 14 is operated by the pivotal reflector 25, which opens the switch 14 when it pivots out of the light path of the picture-taking objective 26. The unexposed film is denoted by the reference numeral 27. The switch 4, 5 is operated by a projection 28 on the release 29, which latter is biased by a spring 30. A pin stop 31 holds the release 29 in its starting position. The switch 17 for connecting the resistor 18 into the circuit is operated by an inclined shoulder 32 on the release 29.

The circuit just described operates in the following manner. As the release 29 is pressed, the operating switch 2 is closed, in a manner not shown, and the electronic exposure arrangement is connected to the voltage source 1. The capacitor 6 charges through the contact 5 of the switch 4, 5 to the full voltage of the source 1. Since the base of transistor 7 is connected to the negative pole of the source 1, both transistors 7 and 8 are shut off.

The capacitor 13 charges through the switch 14 and the photoconductor 15 to a voltage that is determined by the ratio of the resistances of the photoconductor 15 and the resistor 16. If the scene brightness is sufficient to take a picture, the voltage on the base of transistor 10 is positive with respect to the emitter of this transistor, so that the transistor 10 is turned on. Consequently, transistor 9 also becomes conductive. There appears across the resistor 12 a voltage that is proportional to the voltage across the photoconductor 15.

Since the base of transistor 11 is negative with respect to the emitter of this transistor, transistor 11 conducts. Transistor 19, because it has a positive base-emitter voltage, is also turned on. Transistor 21, however, is turned off. Transistor 23, therefore, is turned on, so that the shutter-control magnet 24 is energized.

As the release 29 is depressed more and more against the force of the spring 30, the reflector 25 is released, in a manner not shown, so that it pivots out of the light path of the objective 26. As the reflector 25 pivots it opens the switch 14, thereby disconnecting the photoconductor 15 from the base of the input transistor 10. The capacitor 13 has stored the voltage that appeared across the resistor 16.

In a manner not shown, the shutter blades are operated. At the same time further movement of the release 29 operates the switch 4, 5 and the switch 17. After the contact 4 is closed, the capacitor 6 begins to discharge through the resistor 3. After the contact 17 is closed, the capacitor 13 begins to discharge through the resistor 18, but at a rate that is much lower than that at which the capacitor 6 discharges. In other words, the time constant defined by the capacitor 13 and the resistor 18 is much longer than the time constant defined by the capacitor 6 and the resistor 3. The base of transistor 10 consequently slowly becomes more and more positive, and the voltage across the resistor 12 slowly increases.

After the amount of time that it takes for the voltage on capacitor 6 to fall to a value approximately equal to that on capacitor 13—in other words, for the base to become positive with respect to the emitter of transistor 7—transistor 7 is turned on, thereby also turning on transistor 8. The voltage across the resistor 12 therefore increases, so that transistors 9 and 10 are turned off. Transistor 11 is consequently turned off, thereby turning off transistor 19, turning on transistor 21, and turning off transistor 23. The shutter-control magnet 24 is therefore de-energized, and the exposure is completed. After the release 29 is let go of, the switches shown in FIGS. 1 and 2 return to their original positions.

Figure 1B:
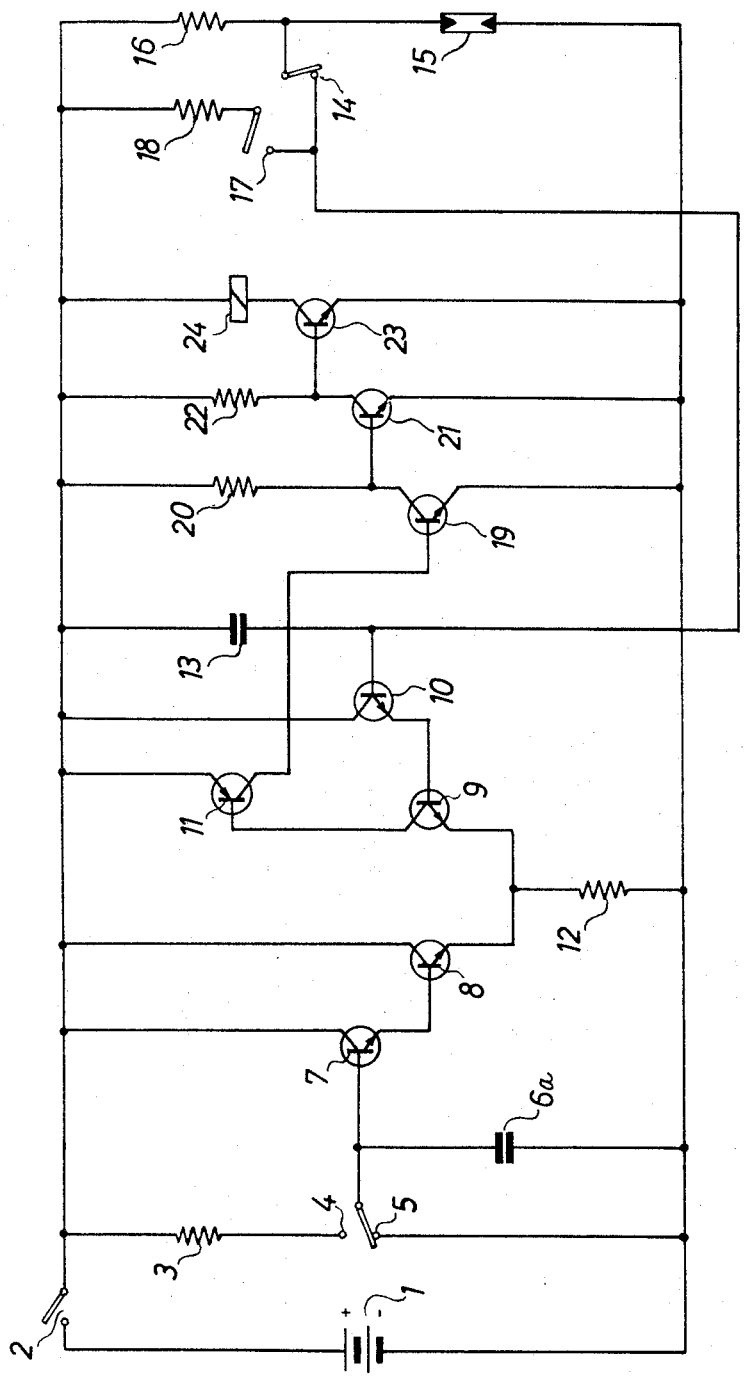
FIG. 1b is a circuit diagram of a second embodiment of the invention.

A second embodiment of the invention is shown in FIG. 1b. This embodiment corresponds to that shown in FIG. 1a, except that the capacitor 6 is replaced by a capacitor 6a connected between the base of the input transistor 7 and the negative pole of the voltage source 1. Before the exposure is begun, the contact 5 of the switch 4, 5 short-circuits the capacitor 6. After the contact 4 is closed, the capacitor 6a charges through the resistor 3. When the voltage across the capacitor 6 has reached a value that is approximately equal to that across the discharging capacitor 13, the shutter-control magnet 24 is de-energized, and the exposure is ended.

By suitably choosing the time constant defined by the capacitor 13 and the resistor 18 the exposure range is widened, on the one hand, and the exposure times are made approximately proportional to the resistance of the photoconductor 15, on the other.

The statements of the preceding paragraph will be apparent from the following discussion. It is clear that the exposure time is determined by the intersection between the discharge curves of the capacitors 6 and 13. In the following, the voltage source 1 is denoted by $U_1$, the resistance of the photoconductor 15 by $R_{15}$, the voltage across capacitor 6 at time T by $U_6$, the voltage across capacitor 13 at time T by $U_{13}$, the resistance of resistor 3 by $R_3$, etc. This intersection is mathematically expressed by the following relationship:

$$U_6 = U_1 \cdot e^{-\frac{T}{R_3 \cdot C_6}} = U_1 \frac{R_{16}}{R_{16}+R_{15}} e^{-\frac{T}{R_{18} \cdot C_{13}}} = U_{13}$$

After logarithmation there is obtained the further relationship:

$$ln\ [1 + R_{15}/R_{16}] = T[(1/R_3 \cdot C_6) - (1/R_{18} \cdot C_{13})]$$

If the relationship $[R_{15}/R_{16}]$ is small, it is exact for high brightness levels, and as a first approximation the expression $ln\ [1 + R_{15}/R_{16}]$ can be replaced by the expression $[R_{15}/R_{16}]$. Once the exposure time T has been begun, there are two further relationships, one of which is exact and the other of which is an approximation:

(1) $$T = \frac{1}{\frac{1}{R_3 \cdot C_6} - \frac{1}{R_{18} \cdot C_{13}}} \ln\left[1 + \frac{R_{15}}{R_{16}}\right]$$

(2) $$T = \frac{1}{\frac{1}{R_3 \cdot C_6} - \frac{1}{R_{18} \cdot C_{13}}} \cdot \frac{R_{15}}{R_{16}}$$

It is apparent from the relationship [2] that the exposure time is proportional to the resistance $R_{15}$ of the photoconductor 15, since all other values are constant.

As scene brightness decreases, the ratio $[R_{15}/R_{16}]$ becomes larger and larger, and the error inherent in the relationship [2] becomes greater. The consequence of this is that the exposure time T is shorter with the relationship [2] than with the relationship [1], for decreasing scene brightness. Up to a certain lower limit for the scene brightness, this error is kept small by the time constant $R_{18} \cdot C_{13}$, since this time constant acts to increase the exposure time.

In the embodiment of FIG. 1b, it can similarly be shown that the exposure times are approximately proportional to the resistance of the photoconductor 15.

The exposure control arrangement of the invention, which is not limited to single lens reflex cameras, can be employed in every other kind of camera. The suitable choice of a time constant for the capacitor 6 and the resistor 3 and a desirably slowly-falling voltage at the base of the transistor 10 ensure that an optimum range of exposures is obtained with small values for the capacitors 6 and 13.

It will be understood that each of the elements described above, or two or more together, may also find a useful application in other types of constructions differing from the types described above, and in other circuits differing from the types described above.

While the invention has been described and claimed as embodied in an electronic exposure control arrangement in photographic apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of the following claims.

What is claimed as new and desired to be protected by Letters Patent is set forth in the appended claims:

1. In a photographic camera having a shutter, an arrangement for timing the duration of shutter opening, comprising in combination, a shutter release activatable for effecting opening of the shutter; a difference amplifier having two inputs and an output; a shutter-control electromagnet connected to the output of said difference amplifier and operative for closing the shutter when equal voltages are applied to the two inputs of said difference amplifier; a voltage source; a voltage divider connected across said voltage source and comprising a light-sensitive element responsive to scene brightness and a first resistor, the voltage divider having a middle tap at the junction between said element and said resistor; a first energy-storing timing capacitor having one terminal connected to one of said inputs to apply to the same a voltage dependent upon the voltage across said first resistor; a second resistor; first switch means coupled to said shutter release and operative in response to activation of said release for effecting a change in the voltage across said first capacitor by so connecting said first capacitor to said second resistor that capacitor current flows through said second resistor, with said change in voltage occurring at a rate dependent upon the RC time constant of said first capacitor and said second resistor; a second timing capacitor connected to the other input of said difference amplifier for applying to the same voltage dependent upon the voltage across said second capacitor; a third resistor constituting a discharge resistor provided for the specific purpose of discharging said third capacitor with an RC time constant dependent upon said second capacitor and said third resistor; and additional switch means coupled to said release and operative in response to activation of said release for connecting said second capacitor in parallel with said first resistor with one terminal of said second capacitor connected to said middle tap, and thereafter operative for disconnecting said one terminal of said second capacitor from said middle tap and connecting said second capacitor in parallel with said third resistor to cause said second capacitor to discharge through said third resistor during the time the shutter is open with an RC time constant determined by said second capacitor and said discharge resistor, with the voltage applied to said other input of said difference amplifier constituting a scene-brightness-dependent threshold signal which changes with time while said shutter is open and changes with time at a rate dependent upon the value of said second capacitor and said discharge resistor, and wherein the RC time constant of said second capacitor and said third resistor is greater than the RC time constant of said first capacitor and said second resistor, the RC time constants being so chosen that the exposure time is approximately proportional to the value of said light-sensitive element over a predetermined range of scene-brightness values.

2. In a camera as defined in claim 1, said camera having an objective and mirror swingable into and out of the objective light path, and wherein said additional switch means comprises a contact normally connecting said middle tap to said one terminal of said second capacitor and mechanically coupled to said swingable mirror in such a manner that when said mirror swings out of the objective light path said contact disconnects said middle tap from said one terminal of said second capacitor.

3. In a camera as defined in claim 1, wherein said first means is a two-position switch normally connecting said first capacitor to said source in such a manner that said first capacitor charges up to the voltage across said source, and movable in response to activation of said release for discharging said first capacitor through said second resistor.

* * * * *